United States Patent [19]

DuBois

[11] 4,155,168

[45] May 22, 1979

[54] POWER EXTENDED TAPE MEASURE

[75] Inventor: R. Clark DuBois, Fairfield, Conn.

[73] Assignee: Fairfield Sailing Supplies, Inc., Fairfield, Conn.

[21] Appl. No.: 876,930

[22] Filed: Feb. 10, 1978

[51] Int. Cl.² .......................... G01B 3/02; B65H 75/16
[52] U.S. Cl. ....................................... 33/138; 242/84.8
[58] Field of Search ........................... 33/137 R, 138; 188/82.1, 82.7; 242/84.8

[56] References Cited

U.S. PATENT DOCUMENTS

| 2,131,695 | 9/1938 | Stowell | 33/138 |
| 3,227,391 | 1/1966 | Quenot | 242/84.8 |
| 3,228,626 | 1/1966 | Quenot | 242/84.8 |
| 3,568,319 | 3/1971 | Moll | 33/138 |
| 3,802,083 | 4/1974 | Freed | 33/138 |

FOREIGN PATENT DOCUMENTS 1236804 3/1967 Fed. Rep. of Germany ............. 33/138

Primary Examiner—Steven L. Stephan

[57] ABSTRACT

A resilient metallic measuring tape of concavo-convex cross-section is coiled in inside wound fashion against an inner peripheral surface of a cup rotatably mounted within a case. The leading end of the tape is laterally offset from the tape coil for extension through a side opening slot in the case. A one-way brake, normally engaging an outer peripheral cup surface to inhibit cup rotation in a tape uncoiling direction, is released to permit automatic uncoiling of the tape into a rectilinear state for progressive extension out through the slot. Brake engagement, however, does not impede cup rotation in the opposite direction incident to manual recoiling of the tape.

15 Claims, 11 Drawing Figures

POWER EXTENDED TAPE MEASURE

BACKGROUND OF THE INVENTION

The present invention relates to measuring tapes and particularly to measuring tapes formed of a resilient metallic ribbon having a concavo-convex cross-section and coiled in an internal or "inside wound" fashion. Measuring tapes of this type are disclosed in a number of early patents issued to Hiram A. Farrand, e.g., U.S. Pat. Nos. 1,402,589; 1,799,044; 1,799,094; 1,906,456 and 2,050,941. Also disclosing measuring tapes of this type are U.S. Pat. Nos. 1,983,503; 2,091,661; 2,131,695; 3,227,391 and 3,228,626. The signal feature of these tape measures is that the tape is coiled against the inner periphery of an annular surface and, when the leading end of the tape is laterally displaced from the coil, the tape will automatically uncoil into a straightened, relatively stiff configuration without the necessity of a separate spring.

A principal object of the present invention is to provide improved means for controlling the uncoiling of an inside wound tape measure.

A further object is to provide an inside wound tape measure of the above character which is equipped with a one-way brake capable, while engaged, of inhibiting tape uncoiling but permitting tape recoiling.

An additional object is to provide an inside wound tape measure of the above character having an outer case constructed so as to control the orientation of the external, straightened portion of the tape for easy reading.

Yet another object is to provide an inside wound tape measure of the above character having various useful features of novelty and advantage. Still another object of the present invention is to provide a tape measure of the above character which is inexpensive to manufacture, reliable in operation and convenient to use.

Other objects of the invention will in part be obvious and in part appear hereinafter.

SUMMARY OF THE INVENTION

In accordance with the present invention, there is provided a resilient metallic measuring tape of concavo-convex cross-section which is coiled against an inner peripheral surface of a cup in inside wound fashion. The cup is rotatably mounted within a case with the leading end of the tape laterally offset from the coil for projection through a formed, side opening exit slot in the case. A one-way brake, mounted within the case, is urged by a spring into engagement with an outer peripheral cup surface to inhibit its rotation in a tape uncoiling direction. Digital depression of the brake against the bias of the spring releases the cup for rotation, and the tape automatically begins to uncoil into a rectilinear state for progressive extension out through the case slot. Upon digital release of the brake, it springs back into engagement with the cup periphery to halt extension. The character of the engagement of the brake with the cup outer periphery is such that, while engaged, cup rotation in the opposite direction incident to manual recoiling of the tape is not impeded.

In accordance with another feature of the invention, the exit slot is located adjacent the bottom of the case and is obliquely angled upwardly such that the uncoiled, extended portion of the tape is cocked upwardly or inclined from the surface being measured for easier reading. Moreover, the trailing end of the tape is not secured to the cup and thus the entire tape may be uncoiled out of the case for use separately from the case.

In an alternative embodiment of the invention, the case is constructed to accommodate a bubble tube enabling the case itself to serve as a level. In addition, a well is provided in the case to hold a pencil. The case, of cubical shape, is further equipped with a protruding lip along one edge for engaging the edge of a workpiece pursuant to providing a T-square function. In addition, the tape coil is oriented within the cubical case such that the extension of the tape therefrom is normal to the case side containing the exit slot, thus facilitating the measurement of inside dimensions.

The invention accordingly comprises the features of construction, combinations of elements and arrangements of parts which will be exemplified in the constructions hereinafter set forth, and the scope of the invention will be indicated in the claims.

For a fuller understanding of the nature and objects of the present invention, reference should be had to the following detailed description taken in conjunction with the accompanying drawings, in which.

Like reference numerals refer to corresponding parts throughout the several views of the drawings.

DETAILED DESCRIPTION

Figure 1:
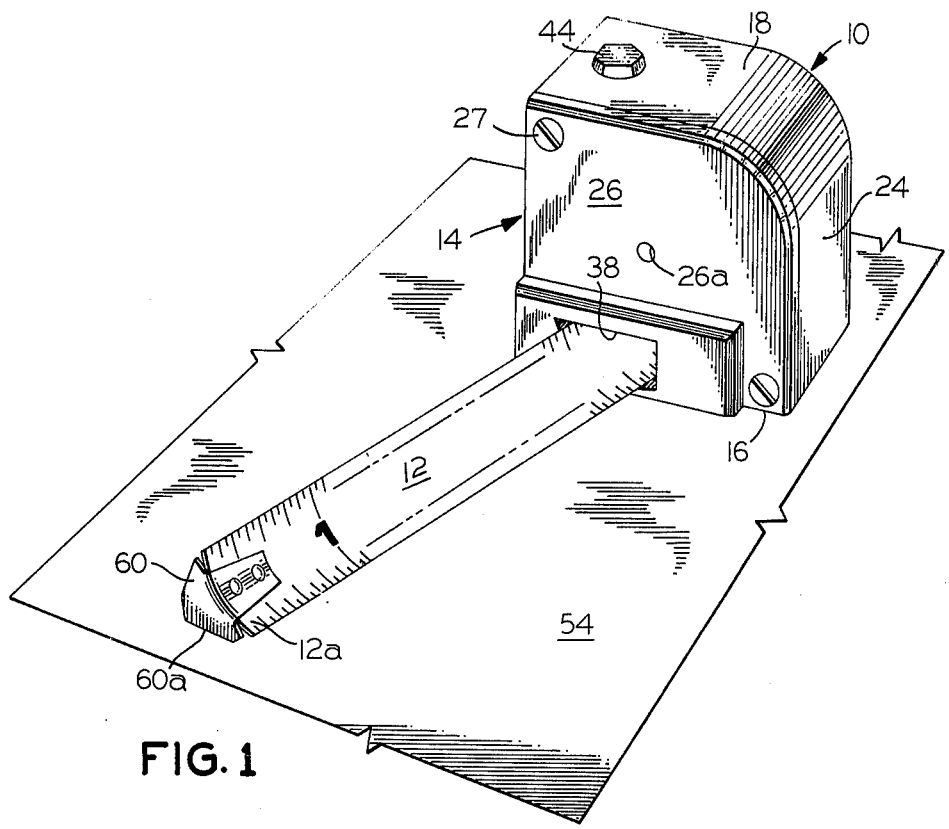
FIG. 1 is a perspective view of a tape measure constructed in accordance with one embodiment of my invention.

Referring now to the drawings, and particularly to FIGS. 1 through 4, a tape measure, generally indicated at 10 and constructed in accordance with one embodiment of my invention, includes an elongated, flexible tape 12 formed of spring metal having a concavo-convex cross-sectional configuration. Consequently, when unrestrained, the tape naturally assumes a relatively stiff, essentially straight or rectilinear condition. A measuring scale is imprinted along the concave side of the tape. When not in use, the tape is stowed in an essentially rectangular case, generally indicated at 14 and preferably formed of a suitable high impact strength plastic having a flat bottom wall 16, top wall 18, back-wall 20, end walls 22 and 24, and a front wall 26 removably secured in place by screws 27. Rotatably mounted within case 14 is a cup, generally indicated at 28 in FIGS. 2, 4 and 5, having an annular sidewall 30 and a conjoined backwall 32. The cup backwall concentrically mounts an axle 34 having a rearward end 34a journalled in a centrally located well 20a molded in case backwall 20 and a forward end 34b journalled in a hole 26a centrally located in front wall 26.

Tape measure 10 is of the "inside wound" type, in that the tape 12 is coiled against the inner peripheral surface 30a of cup sidewall 30, the successive convolutions of the tape being formed within each preceeding convolution. While coiled in this manner the tape cross-section is forced to assume a flat configuration, and thus the coiled tape is in essence a loaded spring awaiting the opportunity to uncoil into its natural rectilinear condition. The terminal end 12a of the innermost tape convolution, which constitutes the leading end of tape 12, is laterally displaced from the tape coil and brought out through a formed slot 38 provided in a lower thickened portion of case front wall 26 adjacent its junction with bottom wall 16. Under these circumstances, the tape would progressively and uncontrollably uncoil out through the slot 38, the uncoiled portion external to case 14 assuming a rectilinear condition, unless some restraint is imposed on the revolvability of the tape coil.

Figure 2:
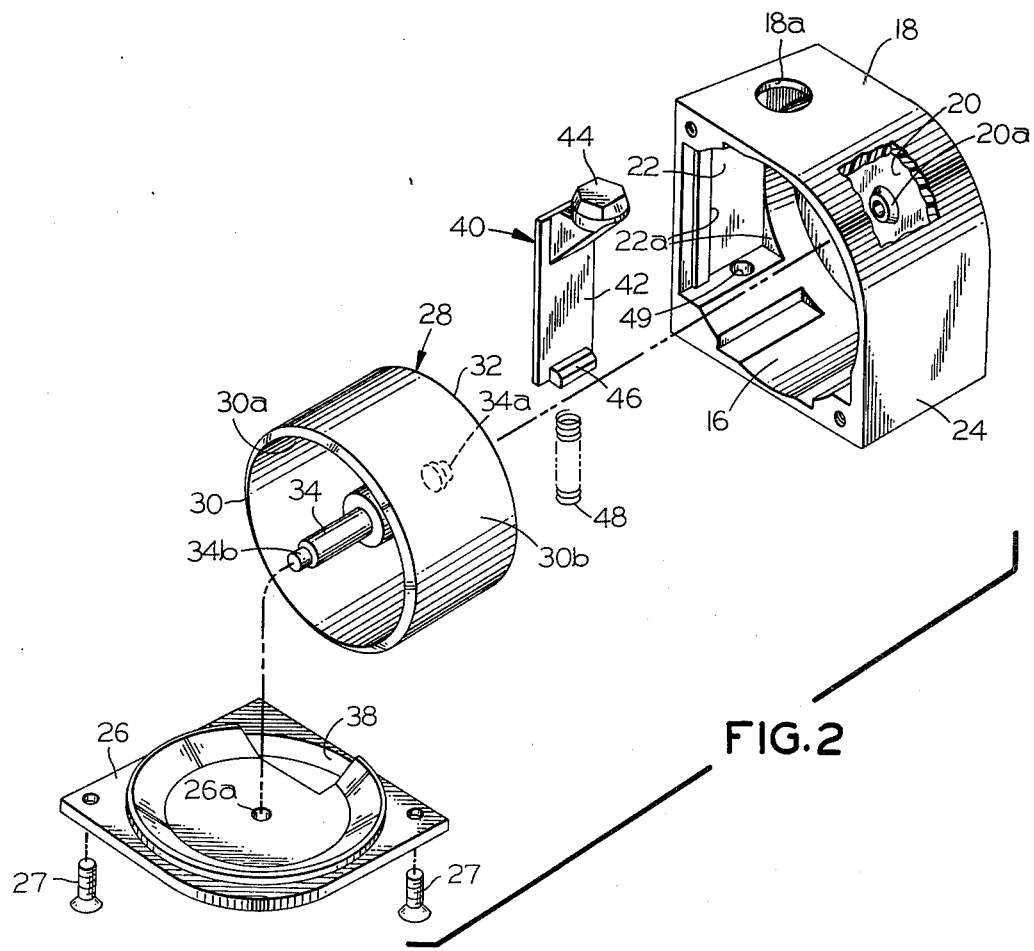
FIG. 2 is an exploded, perspective view of the tape measure of FIG. 1.
Figure 4:
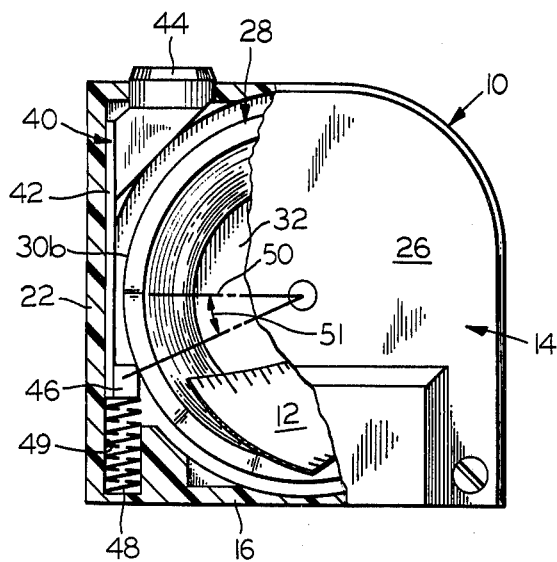
FIG. 4 is a front elevational view, partially broken away, of the tape measure of FIG. 1.

In accordance with the present invention, controlled uncoiling and self-powered extension of tape 12 out from case 14 is provided by a brake mechanism, generally indicated at 40 in FIGS. 2 and 4, which acts against the outer peripheral surface 30b of cup sidewall 30 to inhibit cup rotation in the tape uncoiling direction, which, in FIG. 4, is clockwise. This brake mechanism includes an elongated, flat carrier member 42 positioned against the inner surface of case end wall 22 for limited, vertical sliding movement between the case top and bottom wall. Raised formations 22a formed on the inner surface of case sidewall 22 (FIG. 2) serve to laterally guide carrier 42. Mounted at the upper end of carrier 42 in laterally offset, elevated fashion is a button 44 which protrudes through an opening 18a in case top wall 18. A brake shoe 46 is mounted to the lower end of carrier 42 in confronting relation with the outer peripheral surface 30b of the cup sidewall. A spring 48 seated in a well 49 formed in the inner surface of bottom wall 16 acts against the lower end of carrier to elevate brake shoe 46 into engagement with the cup and button 44 through top wall opening 18a so as to be accessible to digital depression.

The angular location of the engagement of brake shoe 46 with outer peripheral cup surface 30b provides, in accordance with an important feature of the present invention, effective one-way braking action. That is, while the brake shoe is engaging the cup 28, i.e., without digital depression of the brake mechanism, cup rotation in the tape uncoiling, clockwise direction (FIG. 4) is effectively inhibited, while cup rotation in the tape recoiling, counterclockwise direction is not. This one-way braking action is efficiently achieved by positioning the brake shoe to engage the outer peripheral cup surface at an angular location where attempted cup rotation in the tape uncoiling direction inherently increases the brake drag, while cup rotation in the tape recoiling direction inherently decreases the brake drag. Specifically, the brake shoe engages the cup at the angular location shown in FIG. 4 where cup rotation in the tape uncoiling direction produces a force component acting on the brake shoe in the direction to elevate the brake mechanism 40. Under these circumstances, the brake shoe effectively wedges itself between the outer peripheral cup surfaces 30b and case endwall 22 to provide ample brake drag to resist any clockwise cup rotation induced by the inherent tendency of tape 12 to uncoil. Conversely, it is seen that rotation of cup 28 in the tape recoiling or counterclockwise direction produces a force component acting on brake shoe 46 in the direction to depress the brake mechanism; a motion resisted only by spring 48. The bias of this spring is however insufficient to provide effective braking action against cup rotation in the tape recoiling direction. Consequently, the brake mechanism must be depressed in order to achieve self-powered extension of tape 12 out from case 14, whereas the brake mechanism need not be depressed to permit cup rotation in the tape recoiling direction incident to manual pushing of the extended, rectilinear portion of the tape back into the case.

The location of the engagement of the brake shoe with the cup outer periphery is dependent on an analysis of a number of factors including the torque exerted on the cup by the coiled tape 12, the various coefficients of friction involved, the force of spring 48, etc. I have found that an appropriate angular location of brake shoe engagement is within the sector starting from a radial line 50 intersecting the line of movement of the brake mechanism at right angles and extending 30° in the tape recoiling or counterclockwise direction (FIG. 4). Specifically, I have found a suitable angular location 51 for the brake shoe engagement to be approximately 20° in the tape recoiling direction from radial line 50. At this location effective one-way braking is achieved, while at the same time accommodating a conveniently manageable digital force on button 44 to effect disengagement of the brake shoe from the cup outer periphery.

In accordance with an additional feature of my invention, the innermost or trailing end of tape 12 is not attached to cup 28, and consequently the entire length of the tape can be uncoiled out of case 14 for use as a measuring rule separately from the case. To recoil the tape back into the case, the trailing end is simply inserted through slot 38 into engagement with the cup inner peripheral surface 30a. Progressive pushing of the extended rectilinear portions of the tape back into the case readily effects recoiling in inside wound fashion as the cup rotates in the recoiling direction. Another advantage to leaving the trailing tape end unattached is that the tape can be readily manually extended while the brake mechanism is engaged simply by pulling the tape out. Even though the cup does not rotate in the uncoiling direction, the tape coil can revolve in the tape uncoiling direction to accommodate manual withdrawal of the tape from case 14.

Figure 5:
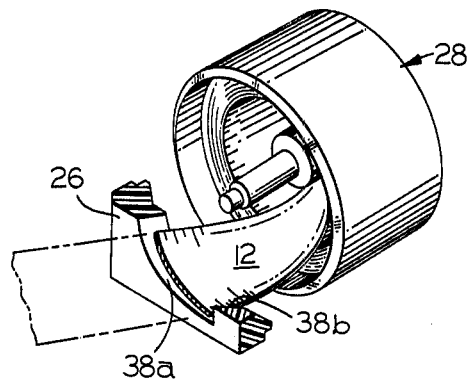
FIG. 5 is a fragmentary perspective view of the tape measure of FIG. 1.
Figure 3:
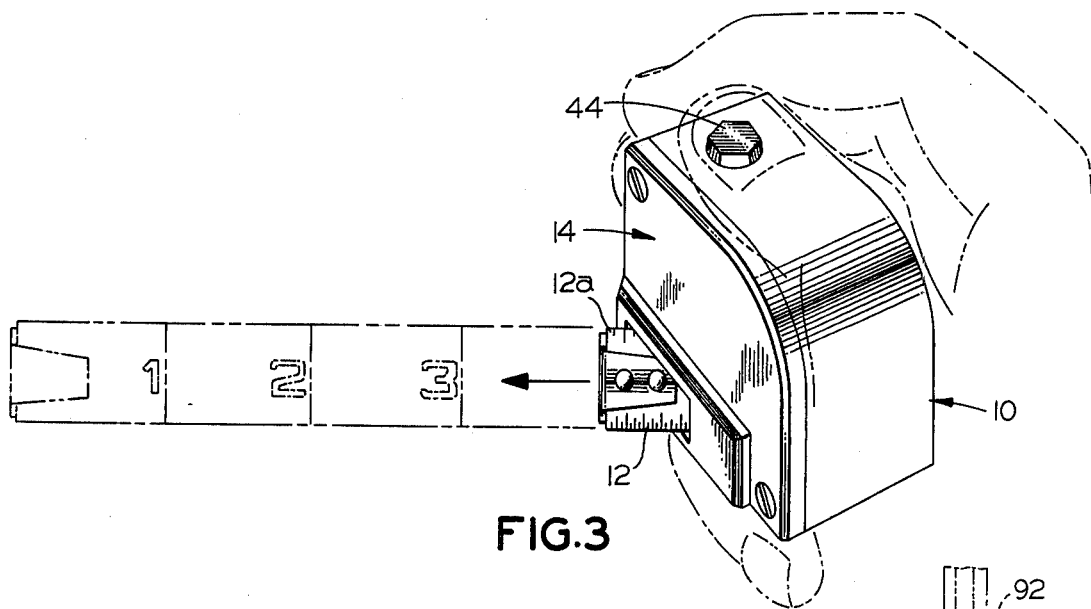
FIG. 3 is a perspective view of the tape measure of FIG. 1, illustrating its manner of use.

From FIGS. 1 and 5, it is seen that tape exit slot 38 is formed in case front wall 26 adjacent case bottom wall 16 with a bottom edge 38a generally inclined at an angle of approximately 30°–45° with respect to the bottom wall. Ideally, this inclined bottom edge is both concave to generally conform to the concave back surface of the tape 12 and beveled to provide a smooth, low friction bearing surface for controlling the orientation of the extended, rectilinear portion of the tape. Specifically, with the flat bottom wall of the case resting on a surface 54 to be measured (FIG. 1) the inclination of the slot bottom edge forces the tape to assume a generally corresponding inclination with respect to this surface. This inclination of the tape, coupled with the disposition of the lower, forward edge of the extended tape in running proximity with the surface 54, makes for greater convenience in reading the tape scale. Also serving in this respect is a hook 60 attached to the leading end 12a of the tape. One corner of this catch is relieved, as indicated at 60a, enabling the catch to serve as a prop assisting the exit slot is preserving the desired inclination of the extended tape portion with respect to surface 54.

A further advantage gained by the inclination of tape exit slot 38 is the lifting of the rearward edge portion of the tape, which serves to minimize engagement of the uncoiled tape portion with the adjacent tape convolution during uncoiling and recoiling operations. The lower front edge 38b of tape slot 38 (FIG. 5) is also beveled to provide a smooth, low friction bearing surface engaging the front edge of the tape to control the direction assumed by the extended portion of the tape.

Figure 6:
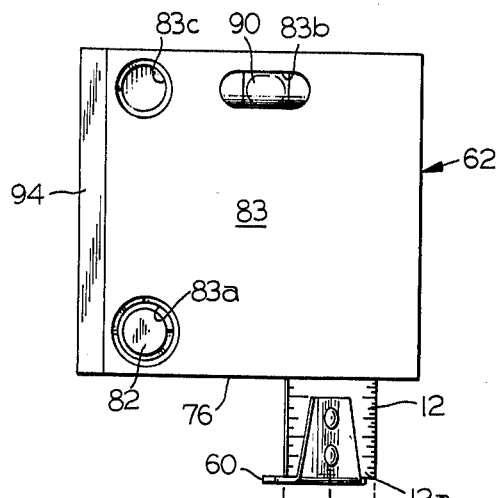
FIG. 6 is a plan view of a tape measure constructed in accordance with an alternative embodiment of my invention.
Figure 7:
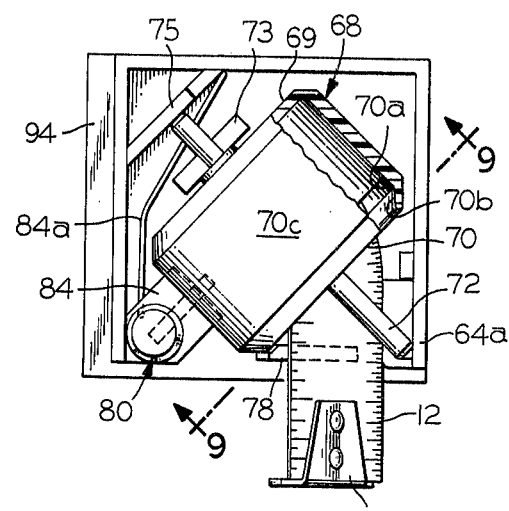
FIG. 7 is a plan view of the tape measure of FIG. 6, with the case cover removed.
Figure 8:
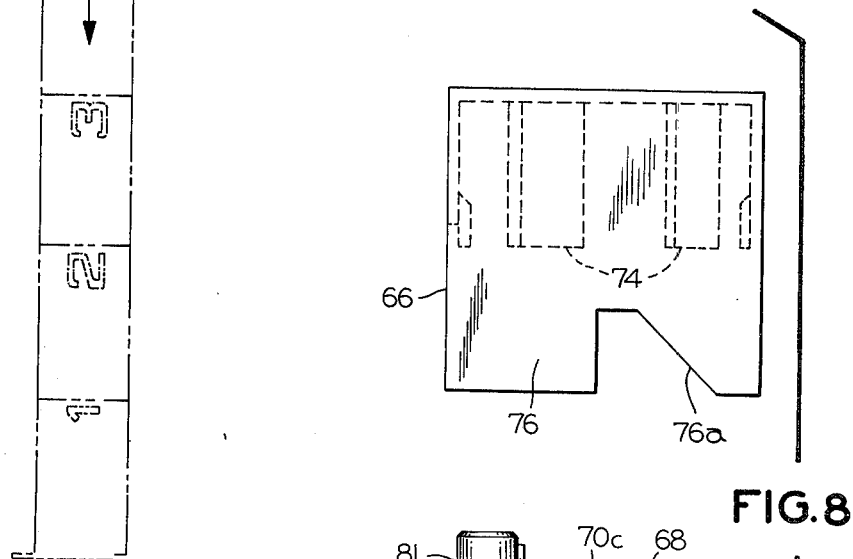
FIG. 8 is an exploded front elevational view of the tape measure of FIG. 6.

In accordance with the alternative embodiment of my invention seen in FIGS. 6 through 11, tape 12 is stowed in a cubical case, generally indicated at 62 and including a base 64 and a box-like cover 66 (FIG. 8). Rotatably mounted within case 62 is a cup generally indicated at 68 in FIGS. 7-9, having a backwall 69 and a sidewall 70 providing an inner peripheral surface 70a against which tape 12 is coiled in inside wound fashion. The rim 70b of cup 68 is turned radially inwardly to provide a bearing surface for the back side of the tape effective in lifting the uncoiling portion of the tape away from the adjacent convolution, thereby minimizing wiping therebetween which, in time, could rub away the scale indicia. The cup back wall mounts an axle 72 whose terminal portions are journalled in crotches in posts 73 upstanding from base 64 (FIGS. 7 and 8). Depending posts 74, formed with cover 66, shown in phantom in FIG. 8, lightly bear down on axle 72 to maintain its position in the crotches of posts 73. An upstanding barrier 75 (FIG. 7) and an upstanding sidewall 64a of base 64 serve to axially locate axle 72 within case 62.

Figure 10:
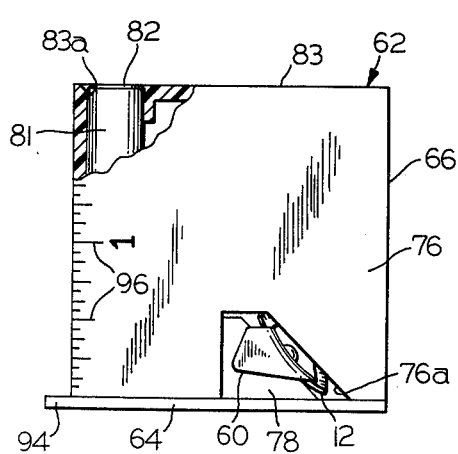
FIG. 10 is a front elevational view, partially broken away, of the tape measure of FIG. 6.

The full height sidewall 76 of cover 66, best seen in FIGS. 8 and 10 as constituting what may be considered the front wall of case 62, is provided with a triangularly shaped notch 76a in its lower edge which bears against base 64. This notch cooperates with a triangular member 78 upstanding from base 64 in defining an inclined exit slot through which the leading end 12a of tape 12 extends. The location of this exit slot coupled with the diagonal mounting of cup 68 within case 62 cause the tape to extend from the case in a direction essentially normal to front wall 76 as seen in FIG. 6. Under these circumstances, the back wall of the case can be abutted against one opposing surface and the leading end of the tape abutted against another opposing surface, and, knowing the case depth, the distance between these opposing surfaces can be conveniently measured.

As in the embodiment of FIG. 1, the location and inclination of the exit slot formed by notch 76a and triangular member 78 coupled with the corner relieved hook 60 attached to the tape leading end serve to orient the extended portion of the tape at a suitable oblique angle relative to a surface to be measured with the lower edge of the tape in running proximity with the surface, thereby rendering scale readings more convenient and precise.

Figure 9:
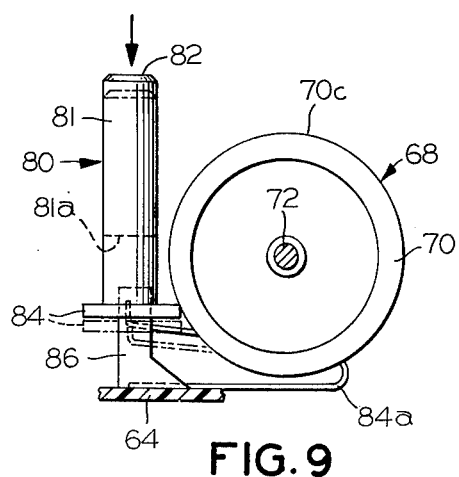
FIG. 9 is a sectional view taken along line 9—9 of FIG. 7.

As in the previously described embodiment, rotation of cup 68 is controlled by a one-way brake mechanism, generally indicated at 80 in FIGS. 7-9. This brake mechanism includes an elongated, cylindrical body or carrier 81 having an upper termination 82 which normally protrudes through an opening 83a in the top wall 83 of cover 66 so as to be accessible for digital depression. The lower end of the carrier mounts a brake shoe 84 which is elevated into engagement with the outer peripheral surface 70c of cup sidewall 70 by a hairpin spring 84a. To assist opening 83a in guiding the movement of carrier 81 between brake engaged and brake disengaged positions, a guide post 86, upstanding from base 62, extends upwardly into a guide slot 81a formed in the carrier. Preferably, as seen in FIG. 7, carrier 81 is positioned in a corner of the case so as to be afforded lateral backing from the case walls while the brake shoe is braking cup 68 against rotation in the tape uncoiling direction. In all respects, brake mechanism 80 functions in the manner of brake mechanism 40 previously described in connection with the embodiment of FIGS. 1-5.

Figure 11:
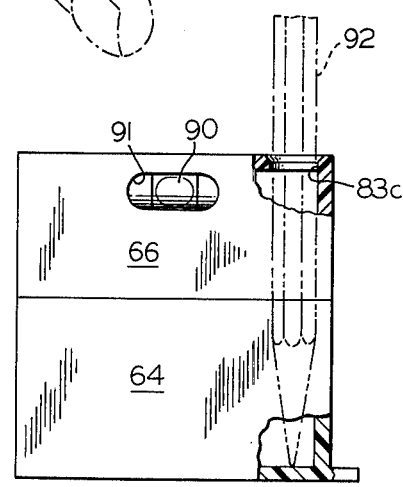
FIG. 11 is a back elevational view of the tape measure of FIG. 6.

The cubical nature of case 62 lends itself to other useful functions, apart from storing and controlling tape 12. Specifically, as seen in FIG. 6, top wall 83 is provided with a recess 83b in which is lodged a bubble tube 90 such that, with base 64 resting on a planar surface, the bubble tube provides a reasonable indication of whether or not the surface is horizontal. As seen in FIG. 11, an opening 91 may be provided in the case backwall so that the bubble tube is viewable from the side as well as from above the case. In addition, top wall 83 is provided with a hole 83c for accommodating the insertion of a pencil 92 (FIG. 11) thus enabling case 62 to also serve as a pencil holder. It is noted from FIG. 7 that the inserted end of the pencil is confined in the corner of the case partitioned off by barrier 75 and thus can not move into interference with brake mechanism 80 or cup 68. Finally, base 64 is provided with a lip 94 (FIG. 10) which protrudes beyond the case sidewall to enable case 62 to function as a square. That is, with the upper surface of protruding lip 94 abutting the edge of a workpiece (not shown), the adjacent corners of the case constitute straight edges lying normal to the workpiece edge. For added convenience, these corners are provided with measuring scale indicia as indicated at 96.

From the foregoing description, it is seen that the present invention provides a tape measure which is efficient in design, inexpensive to manufacture and convenient to use. In fact, since the tape automatically extends itself upon release of the brake, a typical measurement taking procedure requires but one hand of the user, leaving the other hand free to make immediate pencil markings or notations. Moreover, since the trailing end of the tape can be and preferably is left unattached to the cup, it can be readily exchanged for tapes of different lengths or of different measuring scale units.

It will thus be seen that the objects set forth above, among those made apparent in the preceding description, are efficiently attained and, since certain changes may be made in the above constructions without departing from the scope of my invention, it is intended that all matter contained in the above description or shown in the accompanying drawings shall be interpreted as illustrative and not in a limiting sense.

Having described my invention, what I claim as new and desire to secure ty Letters Patent is:

1. A tape measure comprising, in combination:
   A. An elongated, resilient metallic tape of concavo-convex cross-section having the tendency of assuming a rectilinear state, said tape bearing a measuring scale along its length;
   B. a case having bottom, top, end and side walls;
   C. a cup rotatably mounted within said case, said cup having an outer peripheral surface and an inner peripheral surface against which said tape is coiled with each successive tape convolution coiled within the preceding one;

D. means forming a slot in one sidewall of said cast at a location adjacent said bottom wall, the leading end portion of said tape being laterally displaced from the tape coil for extension through said slot, whereby
1. said tape induces rotation of said cup in a first direction as said tape automatically uncoils, the uncoiling portion of said tape assuming a rectilinear state while extending out of said case through said slot and
2. pushing the rectilinear portion of said tape back into said case through said slot induces rotation of said cup in the opposite direction to facilitate recoiling of said tape against said inner peripheral cup surface; and E. a one-way brake mechanism including
1. an actuator mounted within said case for movement in response to digital actuation,
2. a brake shoe carried by said actuator member for digitally motivated movement from an engaged position in frictional engagement with an annulary surface portion of said cup to a disengaged position displaced therefrom, attempted rotation of said cup in said first direction with said brake shoe in its engaged position produces a force component on said brake shoe acting in the direction of said engaged position, while rotation of said cup in said opposite direction produces a force component on said brake shoe acting in the direction of said disengaged position, whereby, in said engaged position, said brake shoe inhibiting cup rotation in said first direction to restrain automatic uncoiling of said tape while permitting cup rotation is said opposite direction to facilitate manual recoiling of said tape and
3. a spring acting to bias to bias said brake shoe to its engaged position.

2. The tape measure defined in claim 1, wherein said brake shoe engages said other peripheral cup surface.

3. The tape measure defined in claim 2, wherein said actuator is mounted for rectilinear reciprocating movement, and said brake shoe engages said outer peripheral cup surface at an angular location of approximately 20 degeees in said opposite direction from a radial line extending from the axis of cup rotation and intersecting the line of rectilinear actuator movement at right angles.

4. The tape measure defined in claim 2, wherein said actuator is mounted for rectilinear reciprocating movement in proximity with one of said case walls, whereby attempted cup rotation in said first direction with said brake shoe in its engaged position produces a component force on said brake shoe acting in the direction of said engaged position to wedge said brake shoe between said outer peripheral cup surface and said one case wall.

5. The tape measure defined in claim 1, wherein said slot is oriented at an oblique angle relative to said bottom wall, whereby with said bottom wall resting on a surface to be measured, the extended, rectilinear portion of said tape is oriented at a corresponding oblique angle relative to the surface and with the lower lateral edge of said tape in running proximity with the surface.

6. The tape measure defined in claim 5, which further includes a hook affixed to the leading end of said tape, said hook shaped to serve as a prop assisting said slot in orienting the extended portion of said tape.

7. The tape measure defined in claim 5, wherein said actuator is mounted for rectilinear reciprocating movement, and said brake shoe engages said outer peripheral cup surface at an angular location of approximately 20 degrees in said opposite direction from a radial line extending from the axis of cup rotation and intersecting the line of rectilinear actuator movement at right angles.

8. The tape mesasure defined in 5, wherein the trailing end of said tape is unattached to said cup.

9. The tape measure defined in 1, wherein said cup is diagonally mounted within said case such that the extended portion of said tape is oriented normal to said one sidewall containing said slot.

10. The tape measure defined in claim 9, wherein said case includes means for mounting a bubble tube, such that said case can serve as a level.

11. The tape measure defined in claim 9, wherein said case includes means for holding a pencil.

12. The tape measure defined in claim 9, wherein said case includes a protruding lip extending along one corner and a measuring scale imprinted along another corner of said case normal to said one corner.

13. The tape measure defined in claim 9, wherein said slot is oriented at an oblique angle relative to said bottom wall, whereby with said bottom wall resting in a surface to be measured, the extended, rectilinear portion of said tape is oriented at a corresponding oblique angle relative to the surface and with the lower lateral edge of said tape in running proximity with the surface.

14. A tape measure comprising, in combination:
A. an elongated resilient metallic tape of concavoconvex cross-section bearing a measuring scale along its length, said tape having the tendency of assuming a rectilinear condition when unrestrained;
B. a case having a flat bottom wall, a top wall and opposed side and end walls;
C. a cup rotatably mounted within said case and having an inner peripheral surface against which said tape is coiled in side wound fashion;
D. means forming a slot in one of said case sidewalls at a location adjacent said flat bottom wall, the leading end of said tape being laterally offset from the plane of the inside wound tape coil for extension through said slot, said slot being oriented at an oblique angle relative to said flat bottom wall and having low friction tape bearing surfaces controllably directing the longitudinal extension of the uncoiled rectilinear portion of said tape from said case, lifting the uncoiled rectilinear tape portion out of wiping contact with the adjacent tape convolution at the point of uncoiling, and transversely orienting said rectilinear tape portion substantially at a corresponding oblique angle relative to a planar surface on which said case bottom wall and a lateral edge portion of said rectilinear tape portion rest; and
E. a manually operable brake acting on said cup to control rotation thereof in a tape uncoiling direction.

15. The tape measure defined in claim 14, which further includes a hook attached to the leading end of said tape and having an edge also resting on the planar surface to assist said slot in transversely orienting said tape.

* * * * *